(12) United States Patent
Rao et al.

(10) Patent No.: US 10,104,181 B1
(45) Date of Patent: Oct. 16, 2018

(54) SECURE CONTEXT-BASED GROUP COLLABORATION AND COMMUNICATION

(71) Applicant: Amazon Technologies, Inc., Seattle, WA (US)

(72) Inventors: Siddhartha Shankara Rao, Seattle, WA (US); Thaddeus C. Pritchett, Edmonds, WA (US); Pavan Kumar Surishetty, Seattle, WA (US); Nathan Lee Burns, Mountain View, CA (US); Collin Charles Davis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 192 days.

(21) Appl. No.: 14/984,544

(22) Filed: Dec. 30, 2015

(51) Int. Cl.
G06F 15/16 (2006.01)
G06F 3/00 (2006.01)
H04L 29/08 (2006.01)
H04L 29/06 (2006.01)

(52) U.S. Cl.
CPC ............ *H04L 67/141* (2013.01); *H04L 63/08* (2013.01); *H04L 63/10* (2013.01)

(58) Field of Classification Search
CPC .... G06Q 10/10; G06Q 10/107; G06Q 10/109; H04L 29/06; H04L 29/08072; H04L 29/06027; H04L 12/581; G06F 3/0482
USPC ........................................................ 709/204
See application file for complete search history.

(56) References Cited

U.S. PATENT DOCUMENTS

| 2010/0058410 A1* | 3/2010 | Rance ................... H04N 7/173 725/109 |
| 2012/0198355 A1* | 8/2012 | Lau ........................ G06Q 10/10 715/752 |
| 2015/0310188 A1* | 10/2015 | Ford ....................... G06F 21/10 726/28 |

OTHER PUBLICATIONS

Web article: "Add to Slack" published 2015 [online][retrieved on Dec. 15, 2015] retrieved from: https://www.producthunt.com/tech/slack-it, 3 pages.

(Continued)

*Primary Examiner* — Mahran Abu Roumi
(74) *Attorney, Agent, or Firm* — Lee & Hayes, PLLC

(57) ABSTRACT

A computing device can be utilized to submit content to a collaboration service for posting on a collaboration channel. In response to receiving a posting request, the collaboration service identifies a context associated with the request. The context might include the location of the computing device submitting the request, the authenticated identity of the user submitting the request, or access rights associated with the content to be posted. The collaboration service can utilize the context to identify one or more collaboration channels to which the content can be posted. The user might be permitted to select one or more of the identified channels. Once the content has been posted to the selected channel, or channels, the collaboration service can utilize the context to perform other actions such as, but not limited to, initiating a communications session between authorized users of the collaboration channel to which the content was posted.

14 Claims, 11 Drawing Sheets

(56) References Cited

OTHER PUBLICATIONS

Web article: Bryant, Martin "New on TNW: Share us to Slack!" published 2015 [online][retrieved on: Sep. 25, 2015] retrieved from: http://thenextweb.com/voice/2015/09/01/new-on-tnw-share-us-to-slack/, 7 pages.
Web article: "Evernote" published 2015, copyright 2015 Evernote Corporation [online][retrieved on: Dec. 15, 2015] retrieved from: www.evernote.com, 4 pages.

* cited by examiner

SECURE CONTEXT-BASED GROUP COLLABORATION AND COMMUNICATION

BACKGROUND

In many types of organizations it is important for team members to be able to quickly share and discuss information. For instance, in some organizations a team of individuals may be charged with quickly responding to network service outages, customer complaints, or other types of time-sensitive technical or business issues. It is not unusual in these scenarios for team members to learn of a network service outage, customer complaint, or other type of issue by way of information sources that are external to the organization. For example, a team member might find a public posting on a social network or web site indicating that a customer has a complaint, that a network service is experiencing an outage, or identifying another technical issue.

In scenarios such as those described above, it is not uncommon for team members to share information manually. For instance, in the example given above, a team member might send other team members an email message containing a hyperlink to the social network posting or web site where the customer complaint or network service outage has been reported. Similarly, one of the team members might manually initiate a telephone call with other team members to discuss the issue and to determine an approach for resolving the issue.

Manually-initiated communications, such as those described above, can increase the amount of time required for a team to address an issue. For example, an email message sharing details of a time-sensitive issue with other team members might be delayed or might not reach one or more of the team members. Similarly, it might take a significant amount of time for a team member to identify the other team members that should participate in a telephone call about a particular issue. Manually-initiated communications might also result in the inadvertent sharing of sensitive information with unauthorized individuals. An email message between team members containing a discussion of a sensitive issue might, for example, be inadvertently sent to an incorrect and unauthorized recipient. The disclosure made herein is presented with respect to these and other considerations.

DETAILED DESCRIPTION

Figure 1A:
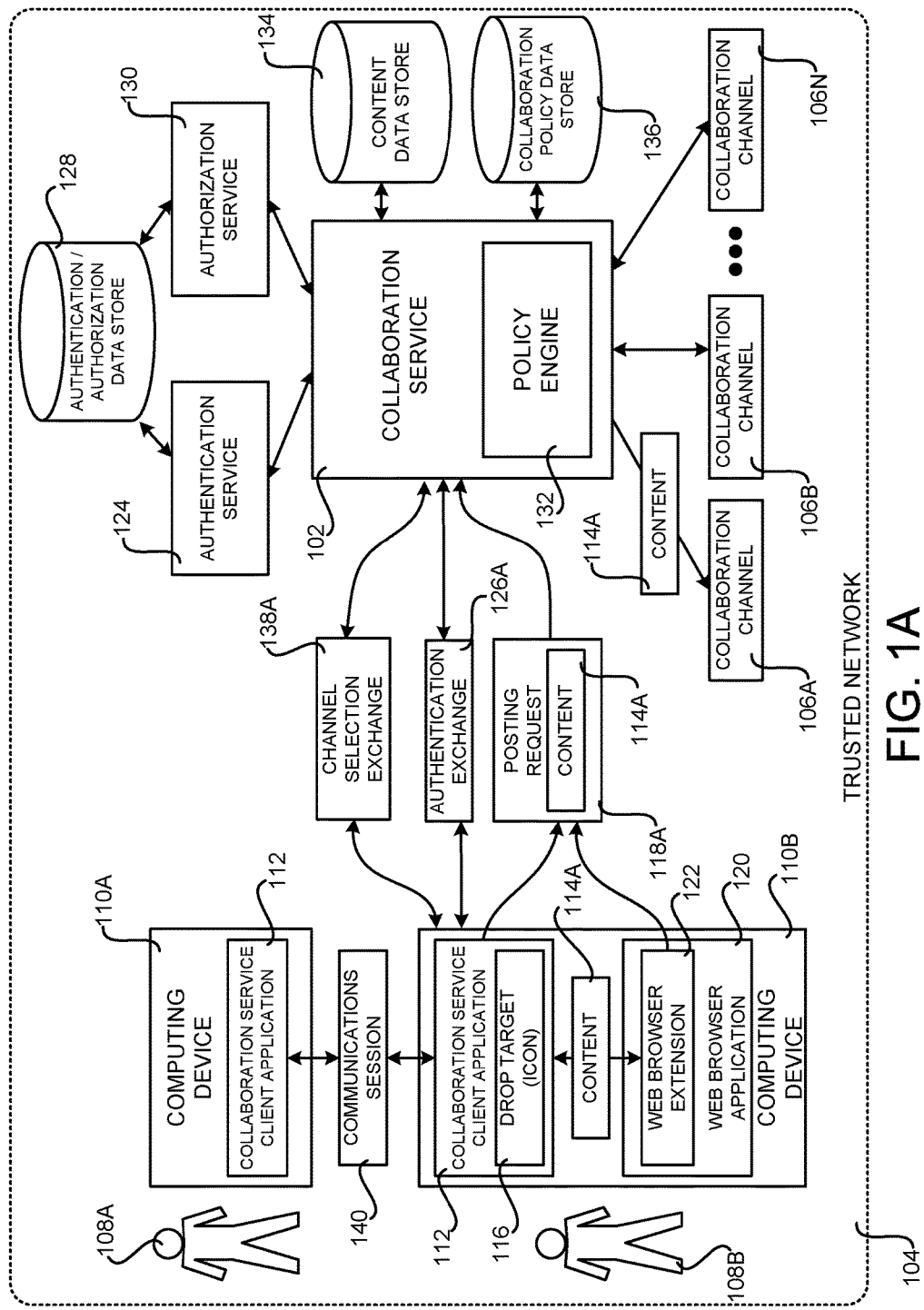
FIGS. 1A-1C are software and network service architecture diagrams that show various aspects of the operation of a collaboration service configured for secure context-based group collaboration and communication, according to several configurations disclosed herein.

The following detailed description is directed to technologies for secure context-based group collaboration and communication. Utilizing an implementation of the technologies described herein, a collaboration service can be provided that enables users to quickly and efficiently post content to collaboration channels (which might also be referred to herein as "conversations") for discussion with other authorized users, and to automatically initiate various types of communications sessions between the most appropriate authorized users in order to discuss posted content. The collaboration service can also provide functionality for more secure collaboration and communication between users. As will be discussed in greater detail below, this can be accomplished by examining a context associated with a posting request to identify collaboration channels to which a user is authorized to post. In this manner, content posted by a user can be directed to a collaboration channel, or channels, that is most appropriate for that user.

In one particular configuration, a collaboration service is executed in a trusted network, such as a secure corporate network. The collaboration service provides functionality for allowing authorized users to discuss and otherwise collaborate in one or more collaboration channels. The collaboration channels can provide real-time messaging and other types of functionality for allowing authorized users to collaborate on a given topic, for example. The network in which the collaboration service is implemented restricts access to only authorized users and devices and is, therefore, considered to be "trusted." Various types of authentication and authorization mechanisms, some of which will be described in greater detail below, can be utilized to restrict access to the trusted network in this manner.

Users can access the functionality provided by the collaboration service utilizing various types of computing devices such as, but not limited to, desktop or laptop computers, smartphones, and tablet computing devices. A collaboration service client application (which might be referred to herein as the "client application") can be executed on these devices that is configured to allow users to utilize the various types of functionality provided by the collaboration service. In some configurations, these devices also include a web browser application that provides functionality for browsing the world wide web ("web") or other types of information sites. A web browser extension (which might be referred to herein as the "browser extension") can also be provided that enables various types of functionality for interacting with the collaboration service, some of which will be described in greater detail below.

The computing devices utilized to access the functionality provided by the collaboration service can be configured to provide various types of graphical user interfaces ("GUIs") for posting content to collaboration channels provided by the collaboration service. For example, and without limitation, in one configuration the client application is configured to provide a graphical drop target, such as an icon, onto which various types of content can be dropped in order to request that the content be posted to a collaboration channel. For instance, a uniform resource locator ("URL") from a web browser can be dropped onto the drop target in order to post the resource referred to by the URL to a collaboration channel. Similarly, text can be selected and dropped onto the drop target in order to post the selected text to a collaboration channel. Likewise, a document such as a word processing document, a spreadsheet document, a presentation document, or another type of document, can be dropped onto the drop target to post the document to a collaboration channel. Other types of content, such as audio files or video files, can also be dropped onto the drop target in order to post the content to a collaboration channel.

As mentioned briefly above, a web browser extension is also provided in some configurations that implements functionality for interacting with the collaboration service. In one particular configuration, for example, the web browser extension can be utilized to post content to a collaboration channel provided by the collaboration service. For instance, when selected utilizing an appropriate user input selection device, the web browser extension can post content selected in the web browser application, such as a URL or text, to a collaboration channel provided by the collaboration service. It should be appreciated that the various GUIs described briefly above, and in more detail below, for initiating a request to post content to a collaboration channel provided by the collaboration service are merely illustrative and that other types of user interfaces can be utilized in other configurations to initiate such a request.

When a request is received to post content to a collaboration channel provided by the collaboration service, such as through the use of one of the GUI mechanisms described briefly above, a posting request is transmitted to the collaboration service that includes or references the content to be posted. In response to receiving such a request, the collaboration service is configured to determine a context associated with the request. For example, and without limitation, the collaboration service can determine the location of the computing device utilized to submit the request. Likewise, the collaboration service can attempt to authenticate the user of the computing device. The collaboration service can also identify access rights associated with the content to be posted. Other types of context information associated with the request can also be identified.

Once the context associated with the posting request has been determined, the collaboration service can utilize the context to identify one or more collaboration channels to which the content can be posted. For example, and without limitation, if the computing device utilized to submit the posting request is internal to the trusted network and if the identity of the user submitting the request can be authenticated, the collaboration service might select collaboration channels to which the authenticated user is authorized to post. For example, and without limitation, when the device is internal to the trusted network and the user can be authenticated, collaboration channels can be selected for sharing content between authorized users relating to operational issues associated with computing resources operating within the trusted network, relating to customer support issues, relating to relating to software or hardware modifications or upgrades associated with computing resources operating within the trusted network, and/or other topics of interest to authenticated users of the trusted network.

As another example, if the computing device utilized to submit the posting request is external to the trusted network and if the identity of the user submitting the request can be authenticated, the collaboration service might limit the collaboration channels to which the authenticated user is authorized to post because the user is external to the trusted network. As a further example, if the computing device utilized to submit the posting request is external to the trusted network and if the identity of the user submitting the request cannot be authenticated, the collaboration service might select collaboration channels that are suitable for receiving content from non-authenticated users, such as members of the public. Other aspects of the context associated with a posting request, such as the access rights associated with the content, can be utilized to select collaboration channels in other ways in other configurations.

Once the collaboration service has identified the one or more collaboration channels to which the content can be posted, the collaboration service can provide a list of the collaboration channels to the computing device that submitted the posting request. The user of the computing device can then select one or more of the collaboration channels. In turn, the collaboration service posts the content to the collaboration channel, or channels, selected by the user.

The collaboration service can also utilize the context associated with a posting request to determine whether one or more actions are to be automatically taken following the posting of content to a collaboration channel. For example, and without limitation, if the computing device utilized to submit the posting request is internal to the trusted network and if the identity of the user submitting the request can be authenticated, the collaboration service might initiate an audio communications session, a video communications session, or a messaging communications session between the computing device that posted the content and one or more computing devices operated by other authorized users of the collaboration channel to which the content was posted.

As another example, if the computing device utilized to submit the posting request is external to the trusted network and if the identity of the user submitting the request can be authenticated, the collaboration service might cause a notification to be transmitted to other authorized users of the channel to which the content was posted indicating that new content is available. Because the computing device is external to the trusted network, the collaboration service will not initiate an audio, video, or communications session between the authorized users of the collaboration channel in order to ensure that such potentially sensitive communications do not exit the trusted network.

In a similar fashion, if the computing device utilized to submit the posting request is external to the trusted network and if the identity of the user submitting the request cannot be authenticated, the collaboration service might cause a notification to be transmitted to other authorized users of the channel to which the content was posted indicating that the posting was made. In this way, authorized users can be automatically notified of content posted by an external unauthorized user, such as a member of the public. Other types of actions might also be initiated by the collaboration service following the posting of content to one or more collaboration channels.

In some configurations, the collaboration service is further configured to aggregate posted content with previously posted content. For example, and without limitation, if a request is received to post content to a new collaboration channel, the collaboration service can determine if the content has been previously posted to one or more other collaboration channels. If the content has been posted to other collaboration channels, and if the user requesting the posting has sufficient access rights to the other collaboration channels, the posted content can be aggregated with the previously posted content. Duplicate postings of content can also be aggregated in other ways in other configurations.

Through an implementation of the technologies disclosed herein, various types of technical efficiencies can be achieved such as, but not limited to, a reduction in the amount of network bandwidth utilized, a reduction in the amount of processing capability utilized, and a reduction of the amount of memory or other types of data storage capacity utilized. Additional technical benefits other than those described briefly above can also be realized through an implementation of the technologies disclosed herein. Further details regarding the various components and processes described above for secure context-based group collaboration and communication will be presented below with regard to FIGS. 1-6.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. As mentioned briefly above, the configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1B:
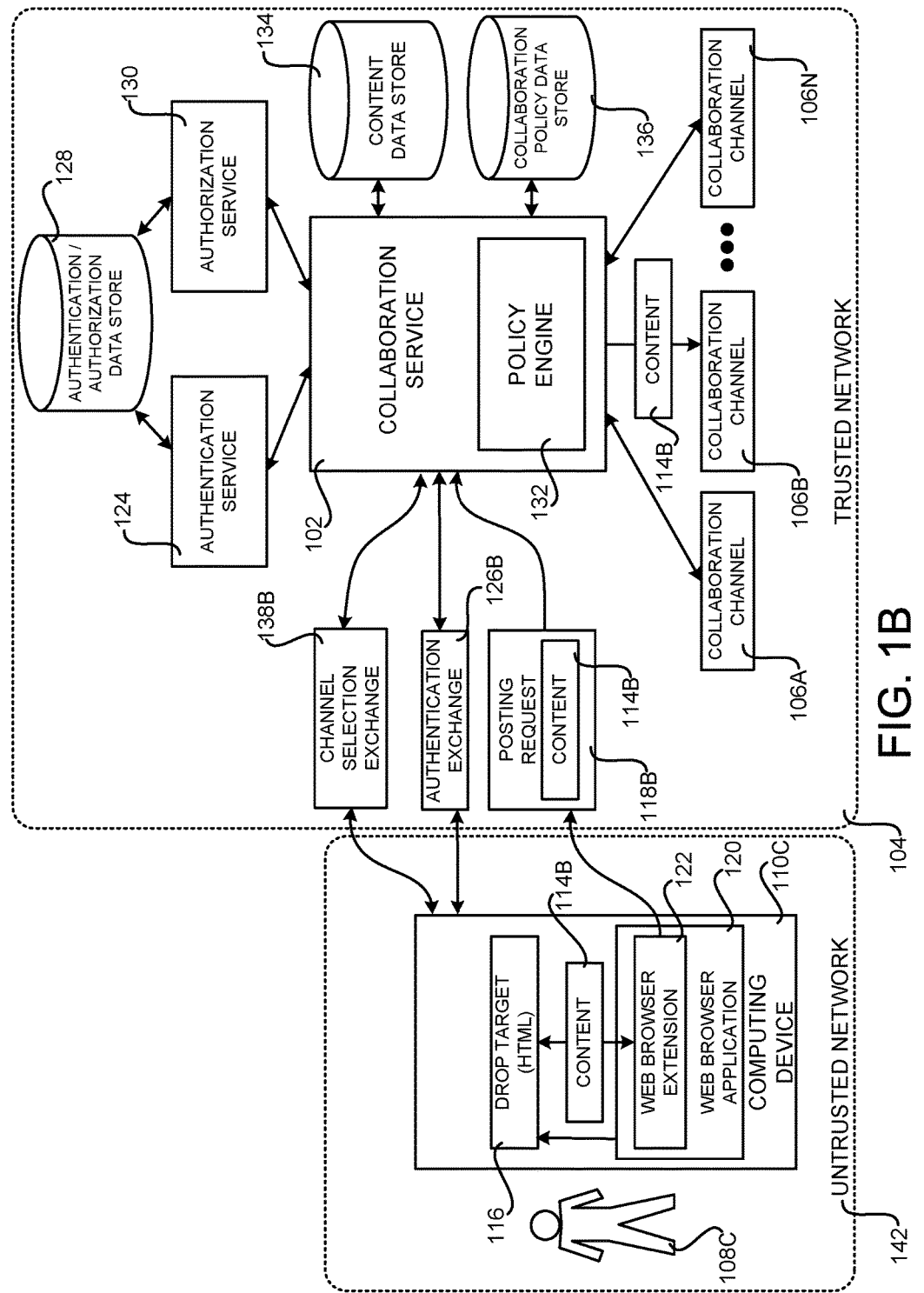
Figure 1C:
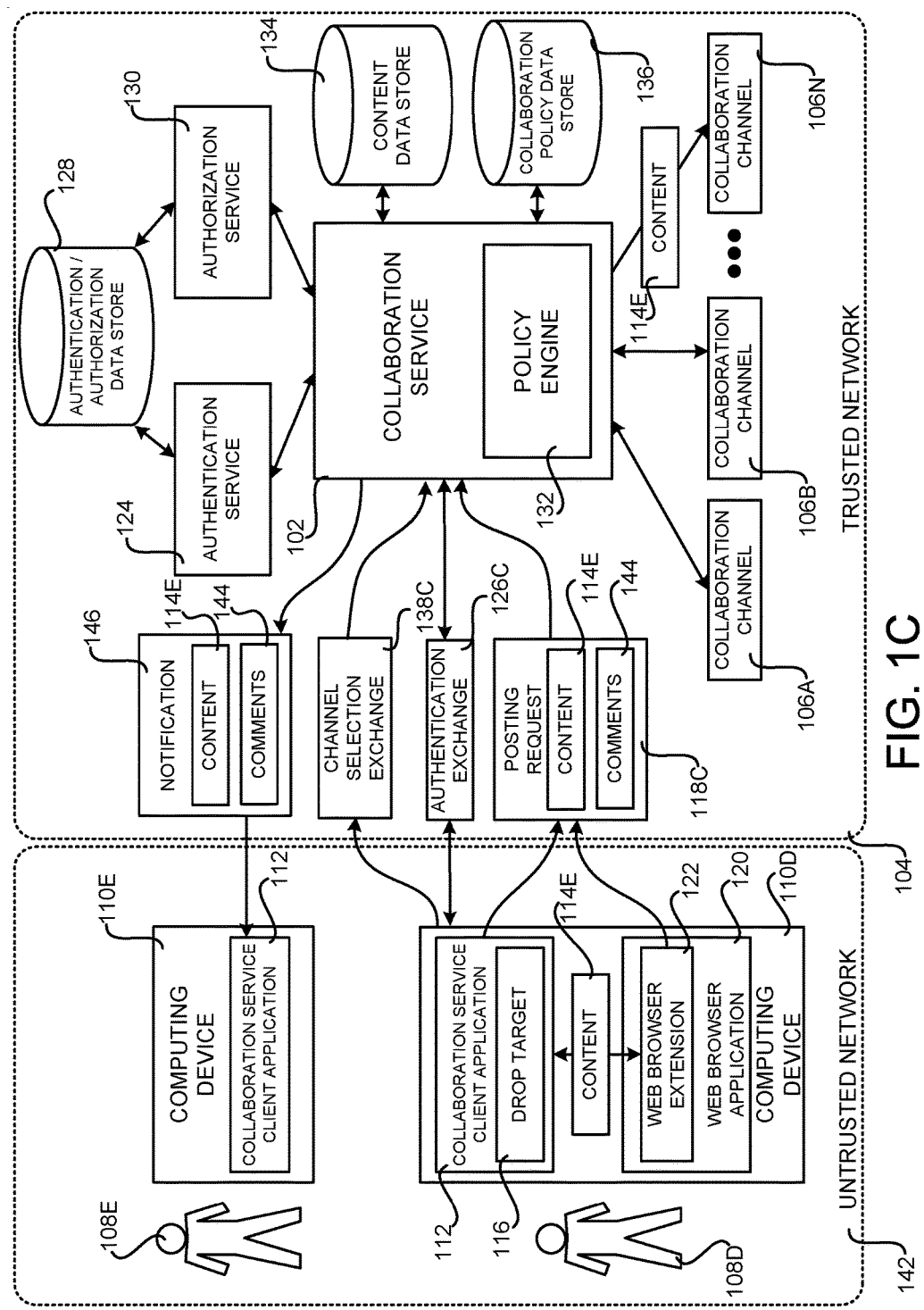

FIGS. 1A-1C are software and network service architecture diagrams that show various aspects of the operation of a collaboration service 102 configured for secure context-based group collaboration and communication, according to several configurations disclosed herein. As shown in FIG. 1A, and described briefly above, the collaboration service 102 is a network service that is executed in a trusted network 104 in one particular configuration. As also described briefly above, the collaboration service 102 provides functionality for allowing collaboration between authorized users, such as the users 108A and 108B (which might be referred to singularly as "a user 108" or collectively as "users 108").

For example, and as also shown in FIG. 1A, the collaboration service 102 can provide functionality for enabling the users 108 to discuss and otherwise collaborate in one or more collaboration channels 106A-106N (which might be referred to singularly as "a collaboration channel 106" or collectively as "collaboration channels 106"). The collaboration channels 106 can provide real-time messaging by integration with a presence service and/or a messaging service, and potentially other types of functionality for allowing authorized users 108 to collaborate on a given topic, for example.

The trusted network 104 in which the collaboration service 102 is implemented can restrict access to only authorized users, such as the users 108A and 108B, and authorized devices, such as the computing devices 110A and 110B (which might be referred to singularly as "a computing device 110" or collectively as "computing devices 110"). Various types of authentication and authorization mechanisms can be utilized to restrict access to the trusted network 104 and the services and resources that it provides to unauthorized users, and to enable access to the trusted network 104 and the services and resources that it provides to authorized users.

For example, and without limitation, an authentication service 124 is provided in one configuration that provides functionality for authenticating users 108 and, potentially, computing devices 110. In particular, the authentication service 124 can implement various authentication mechanisms in order to verify the identity of a user 108 or a device. For example, and without limitation, the authentication service 124 can utilize various authentication mechanisms including, but not limited to, the KERBEROS protocol, public key certificates issued by a trusted certificate authority ("CA"), a pre-shared secret key (i.e. a string of characters known to both the sender and the recipient), smart card—based authentication, fingerprint, voice pattern, retinal scan, or other types of biometric mechanisms, or using some other mechanism by which a user 108 can prove that they are who they claim to be.

The authentication service 124 can utilize these mechanisms and/or potentially others in an attempt to authenticate the identity of a user 108. In order to provide this functionality, the authentication service 124 can store data relating to the authentication of users 108 and/or devices 110 in an appropriate authentication/authorization data store 128. In this regard, it should be appreciated that the authentication mechanisms described above are merely illustrative and that other mechanisms can also or alternately be utilized in attempt to authenticate users 108 requesting access to the trusted network 104 and, more particularly, the collaboration service 102.

As shown in FIG. 1A, the trusted network 104 can also include an authorization service 130. The authorization service 130 is a network service that provides functionality for determining whether a user 108 has the proper privileges, or access rights, to utilize a particular service or resource in the trusted network 104, such as the collaboration channels 106. In order to provide this functionality, the authorization service 130 can also store data in the authentication/authorization data store 128 for use in authorizing user requests.

For example, and without limitation, the authorization service 130 can store access control lists ("ACLs") that describe the rights that users 108 have to access and utilize network services and other types of resources. As one specific example, the ACLs can describe the ability of each user 108 to post to, read from, delete, or otherwise utilize or modify the collaboration channels 106 and the content that they contain. The ACLs can also store data indicating the rights of each user to access the collaboration service 102. Other types of data describing the access rights for the users 108 to utilize other types of services and resources can also be stored and utilized in a similar manner. Other mechanisms can also, or alternately, be utilized by the authorization service 130 to determine the rights that users 108 have to access and utilize network services and other types of resources including, but not limited to, public key certificates issued by a trusted CA, public/private key pairs, encryption, tokens, and/or other mechanisms.

As discussed briefly above, the users 108 can access the functionality provided by the collaboration service 102 utilizing various types of computing devices 110 such as, but not limited to, desktop or laptop computers, smartphones, and tablet computing devices. A collaboration service client application 112 can be executed on the computing devices 110 that is configured to allow the users 108 to utilize the various types of functionality provided by the collaboration service 102.

In some configurations, the computing devices 110 also include a web browser application 120 that provides functionality for browsing web sites or other types of information sites. A web browser extension 122 can also be provided that enables various types of functionality for interacting with the collaboration service 102, some of which will be described in greater detail below.

Figure 2A:
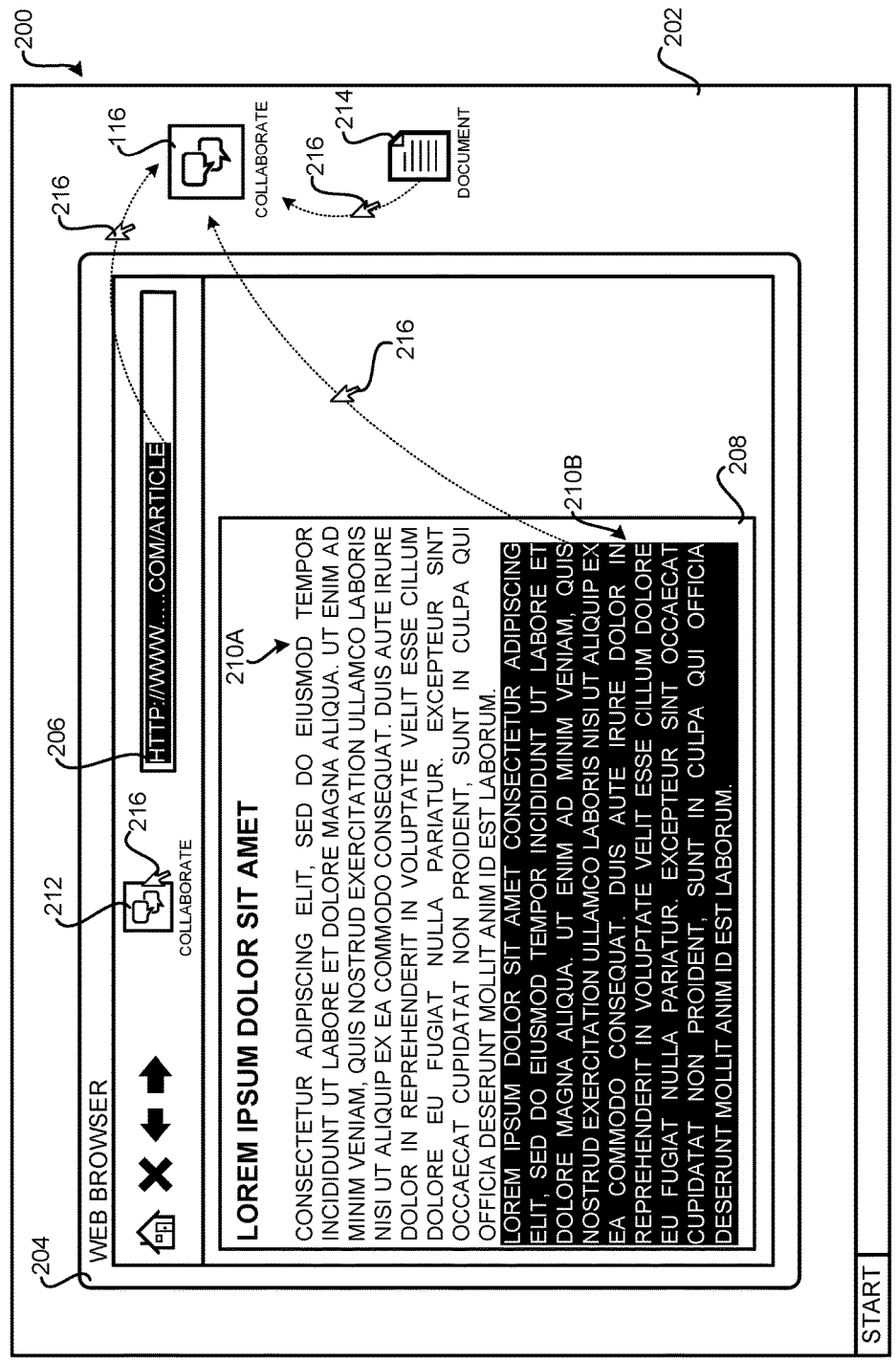
FIG. 2A-2C are user interface diagrams showing aspects of several illustrative graphical user interfaces disclosed herein for initiating a request to post content to one or more collaboration channels provided by a collaboration service configured for secure context-based group collaboration and communication, according to one configuration disclosed herein.
Figure 2B:
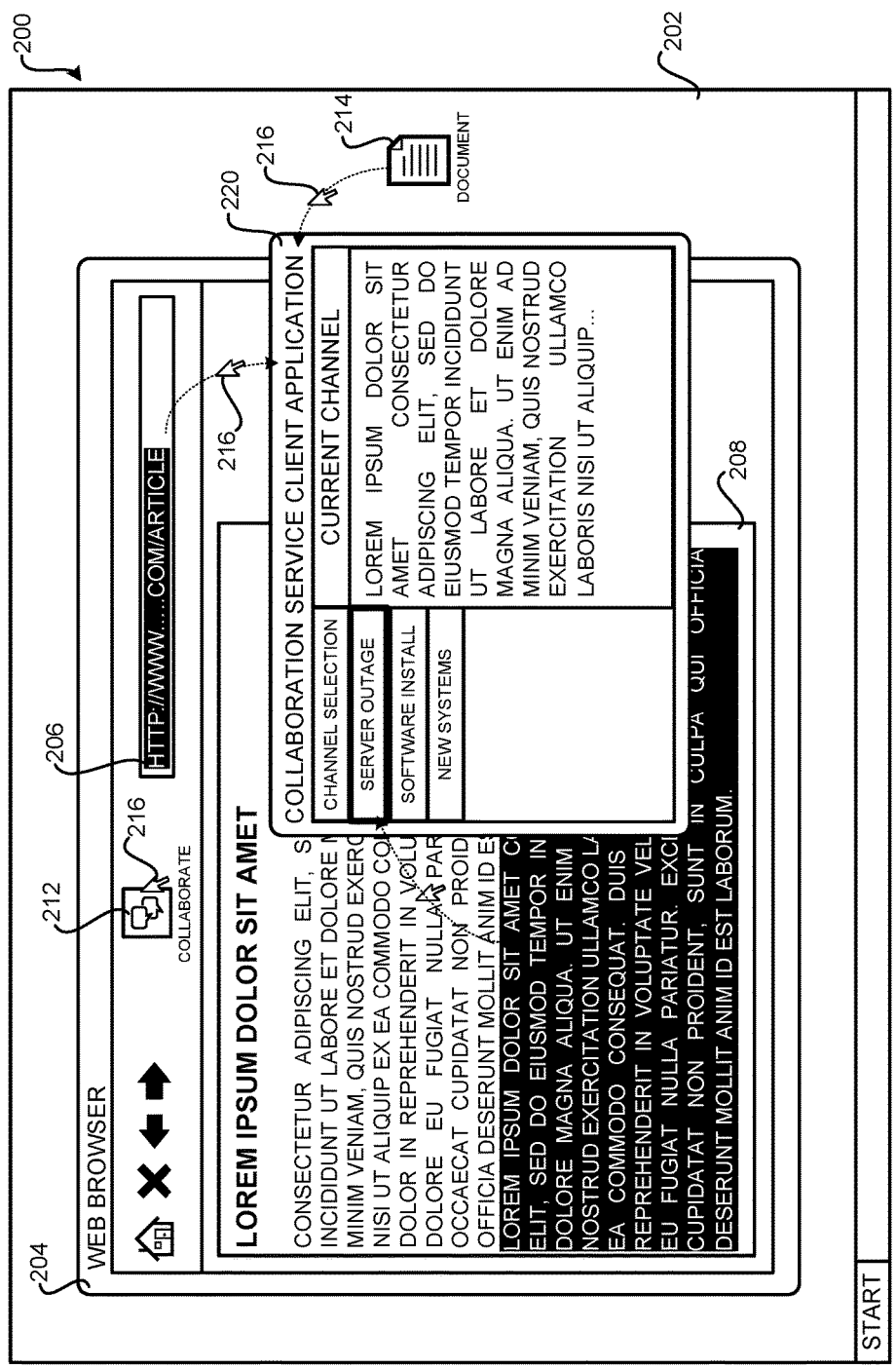
Figure 2C:
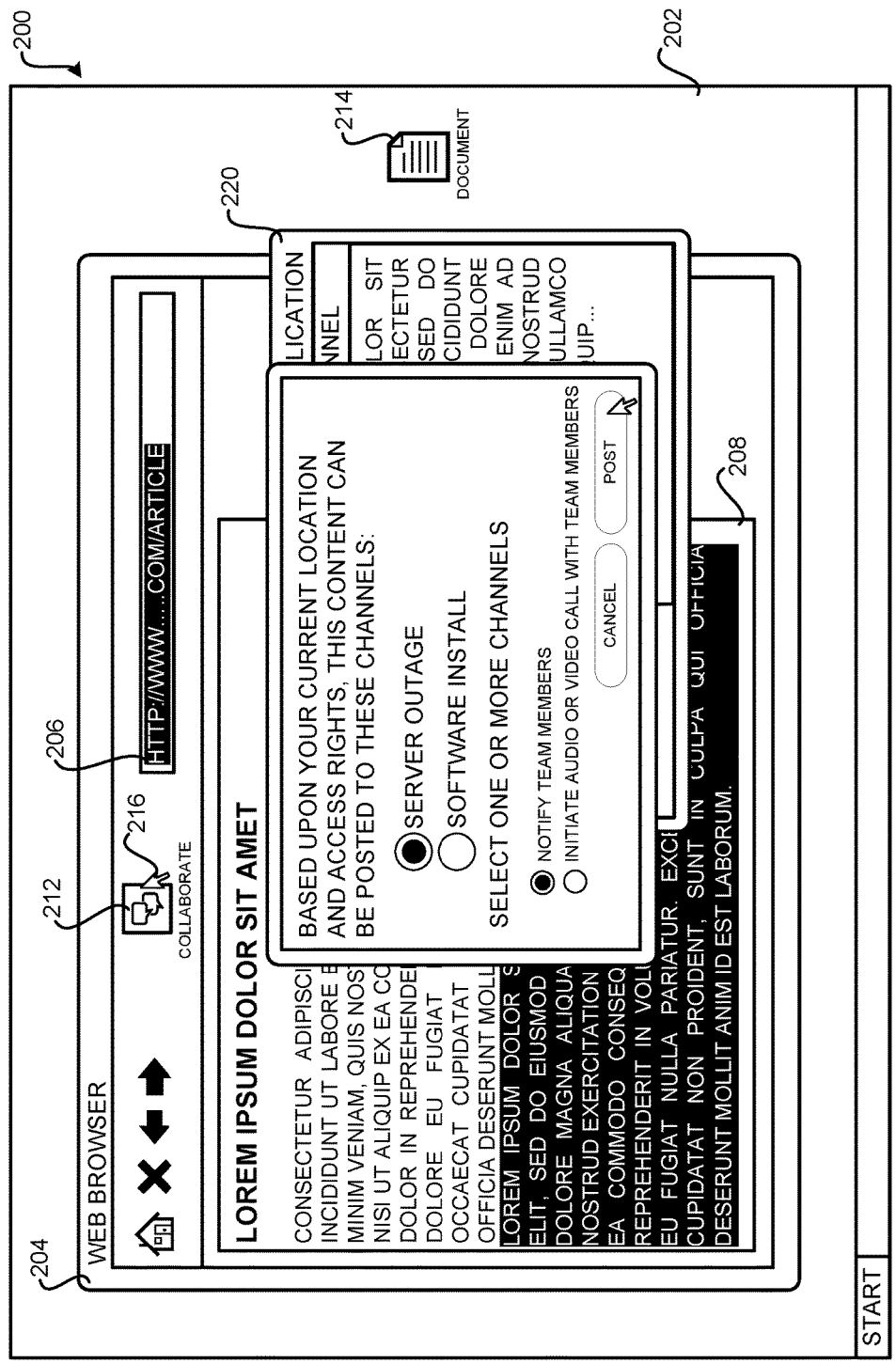

The computing devices 110 utilized to access the functionality provided by the collaboration service 102 can be configured to provide various types of GUIs for posting content 114 to collaboration channels 106 provided by the collaboration service 102. Referring momentarily to FIGS. 2A-2C, several illustrative GUI mechanisms for posting content 114 to a collaboration channel 106, or channels 106, will be described.

FIG. 2A is a user interface diagram showing aspects of one illustrative GUI 200 disclosed herein for initiating a request to post content 114 to one or more collaboration channels 106 provided by the collaboration service 102, according to one configuration disclosed herein. As shown in FIG. 2A, the illustrative GUI 200 can be implemented in conjunction with a UI 204 provided by the web browser application 120 and a user interface desktop 202 provided by an operating system, such as the WINDOWS operating system from MICROSOFT CORPORATION or the OSX operating system from APPLE, INC. In this regard, it should be appreciated that the configurations shown in FIG. 2A are presented for illustrative purposes and that other types of GUIs can be utilized to provide similar functionality on smartphone devices, tablet devices, or other types of computing devices not specifically mentioned herein.

As shown in FIG. 2A, and described briefly above, the client application 112 is configured to provide a graphical drop target 116, such as an icon in the illustrated example, onto which various types of content 114 can be dropped in order to request that the content 114 be posted to a collaboration channel 106 provided by the collaboration services 102. For instance, a URL 206 presented in the UI 204 can be selected with a cursor 216, dragged, and dropped onto the drop target 116 utilizing an appropriate user input devices (e.g. mouse, track pad, touchscreen, etc.) in order to post the resource referred to by the URL 206 to a new or existing collaboration channel 106, or channels 106. The dashed lines in FIG. 2A illustrate various paths of the cursor 216 when dragging different types of content 114 to the drop target 116.

In a similar fashion, text 210 can be selected, dragged, and dropped onto the drop target 116 in order to post the selected text to a collaboration channel 106, or channels 106. In the example shown in FIG. 2A, for instance, the UI 204 is displaying the text 210A and the text 210B. In this example, a user has selected the text 210B with the cursor 216, dragged the text 210B to the drop target 116, and dropped the text 210B on the drop target 116. In this way, the user can request that the text 210B be posted to a collaboration channel 106, or channels 106, maintained by the collaboration service 102.

Likewise, an icon or other representation of a document such as a word processing document, a spreadsheet document, a presentation document, or another type of document, can be selected with the cursor 216, dragged to the drop target 116, and dropped onto the drop target 116 to post the corresponding document to a collaboration channel 106, or channels 106. In the example shown in FIG. 2A, for instance, a user has selected the document icon 214 with the cursor 216, dragged the document icon 214 to the drop target 116, and dropped the document icon 214 on the drop target 116. In this way, the user can request that the document represented by the document icon 214 be posted to a collaboration channel 106, or channels 106. Other types of content 114, such as audio files or video files, can also be selected, dragged, and dropped onto the drop target 116 in order to post the content to a collaboration channel 106, or channels 106.

It should be appreciated that although the drop target 116 is illustrated as a desktop icon in FIG. 2A, the drop target 116 can be implemented in other ways in other configurations. For example, and without limitation, a window, icon, or other location provided by another application, such a UI window 220 displayed by the collaboration service client application 112, can be utilized as a drop target 116 for content 114. This configuration is illustrated in FIG. 2B. In this example, a UI window 220 display by the collaboration service client application 112 presents UI elements corresponding to available channels 106 (i.e. "server outage", "software install", and "new systems"). In this example, content 114 can be dropped onto one of the UI elements corresponding to an available channel 106 in order to have the content 114 posted to the corresponding channel. If the content 114 is dropped onto another area of the UI window 220, the user may be prompted to select the channel 106 to which the content is to be posted. Other options might also be selected for notifying other users of the posting of content 114 and/or initiating a communications session 140 with another user. One example of this UI is shown in FIG. 2C. In this regard, it should be appreciated that the illustrated GUIs are merely illustrative and that other types of drop targets 116 can also be utilized in other configurations.

As mentioned briefly above, a browser extension 122 is also provided in some configurations that implements functionality for interacting with the collaboration service 102. In one particular configuration, for example, the browser extension 122 can be utilized to post content 114 to a collaboration channel 106, or channels 106, provided by the collaboration service 102. In the example shown in FIG. 2A, for instance, the browser extension 122 is configured to provide an icon 212 in an area of the GUI 204. When the icon 212 is selected, such as by the cursor 216, the browser extension 122 can request to post the content 114 that is currently selected in the GUI 204, such as the URL 206 or the text 210B, to a collaboration channel 106, or channels 106, provided by the collaboration service 102.

In one particular configuration, dropping content 114 on a drop target 116 or selection of the icon 212 can cause the selected content to be posted to a channel 106 in which the user is currently having a conversation. In this way, a user need not select the channel 106 to which the content 114 is to be posted. In other configurations, the channel selection exchange 138 described above takes place whereby a user can select the channel 106 to which content 114 is to be posted following selection of the icon 112 or dropping the content 114 on the drop target 116.

It should be appreciated that the various mechanisms described with regard to FIGS. 2A-2C for initiating a request to post content 114 to a collaboration channel 106, or channels 106, provided by the collaboration service 102 are merely illustrative and that other types of mechanisms and user interfaces can be utilized in other configurations to initiate such a request. For example, and without limitation, an HTML DIV element can be utilized to host a drop target within the web browser application 120. Content 114 dropped onto the DIV element can be posted to the collaboration service 102. Other mechanisms can also be utilized in other configurations.

Referring back to FIG. 1A, additional aspects of the operation of the collaboration service 102 will be described. In particular, when a request is received to post content 114 to a collaboration channel 106, or channels 106, provided by the collaboration service 102, such as through the use of one of the GUI mechanisms described above with regard to FIG. 2A, a network request is transmitted to the collaboration service 102 that includes or references the content 114 to be posted. In the example shown in FIG. 1A, for instance, the user 108B has requested that the content 114A be posted to a collaboration channel 106 utilizing the drop target 116 or the browser extension 122. In response thereto, the client application 112 or the browser extension 122, as appropriate, has transmitted a posting request 118A to the collaboration service 102. The posting request 118A includes the content 114A to be posted, or a reference to the content 114A. The posting request 118A can also include other information such as, but not limited to, data indicating the access rights associated with the content 114A to be posted.

In response to receiving a posting request 118, such as the posting request 118A in the example shown in FIG. 1A, the collaboration service 102 is configured to determine a context associated with the request. For example, and without limitation, the collaboration service 102 can determine the location of the computing device 110 utilized to submit the posting request 118. In the example shown in FIG. 1A, for instance, the collaboration service 102 can determine the location of the computing device 110B. The location of the computing device 110B can be determined, for example, by examining a network address or other information associated with the computing device 110B. Other network services in the trusted network 104 can be utilized to assist with the determination of the location of the computing device 110B.

In a similar fashion, the collaboration service 102 can utilize the authentication service 124 (and/or other network services) in an attempt to authenticate the user 108 of the computing device 110 that submitted the posting request 118 (i.e. the user 110B in the example shown in FIG. 1A). For instance, and as illustrated in FIG. 1A, an authentication exchange 126A can be performed with the computing device 110B. The authentication exchange 126A can include a request from the collaboration service 102, or the authentication service 124, for credentials from the user 108B, and a corresponding reply from the computing device 110B with the requested credentials, if available. The authentication exchange 126A can include other types of types of requests and replies in other configurations.

As discussed briefly above, the context information obtained by the collaboration service 102 can also include data identifying the access rights associated with the content 114 to be posted. For example, and as discussed above, the posting request 118 includes data specifying the access rights for the content 114 to be posted in some configurations. The access rights for the content 114 to be posted can be obtained from other locations in other configurations. The access rights for the content 114 can be utilized to identify an appropriate collaboration channel 106 for posting the content 114, can be utilized to restrict the ability of other users to access the content 114, and can be utilized for other purposes in other configurations. For example, and without limitation, if the content 114 has an associated ACL indicating that only particular users are permitted to view the content 114, the collaboration service 102 will only permit the identified users to view the content 114. Similarly, collaboration channels 106 to which the content 114 can be posted might also be selected that include only the users identified by the ACL as being permitted to view the content 114. The collaboration service 102 can also obtain other types of context information associated with a posting request 118 and utilize the context information in a similar manner in other configurations.

Once the context associated with a posting request 118 has been determined, the collaboration service 102 can utilize the context to identify one or more collaboration channels 106 to which the specified content 114 can be posted. For example, and without limitation, the collaboration service 102 can utilize the location of the computing device 110 that submitted the posting request 118, the identity of the user 108 submitting the posting request 118, if available, the access rights associated with the content 114 to be posted, the access rights of the user 108 submitting the posting request 118 to access the available collaboration channels 106 and, potentially, other types of data in order to identify the collaboration channels 106 that are available to the user.

The content 114 itself can also be utilized to identify an appropriate collaboration channel 106 for receiving the content 114. For example, and without limitation, the content 114 can be scanned to identify keywords associated with the content 114. The identified keywords can then be utilized to search metadata associated with the collaboration channels 106 to identify one or more collaboration channels 106 that are appropriate for the posted content 114. Data describing the posting history of the user can also be utilized to determine the collaboration channels 106 to be presented to the user for selection. For example, a predefined number of collaboration channels 106 to which the user has frequently or recently posted content can be presented to the user. Other mechanisms can also be utilized to identify appropriate collaboration channels 106 for receiving content 114 in other configurations.

In the particular example shown in FIG. 1A, the computing device 110B utilized to submit the posting request 118A is internal to the trusted network 104. In this example, therefore, the identity of the user 108B submitting the posting request 118A can also be authenticated. In this example, the collaboration service 102 might select collaboration channels 106 to which the authenticated user 108B is authorized to post (i.e. the collaboration channels 106 for which the user has sufficient access rights to post new content 114A). The list of collaboration channels 106 might be restricted to channels having members that are also authorized to view the content 114A (i.e. users 108 having sufficient access rights to view the content 114A).

Once the collaboration service 102 has identified the collaboration channel 106, or channels 106, to which the content 114 can be posted, the collaboration service 102 can provide a list of the eligible collaboration channels 106 to the computing device 110 that submitted the posting request 118. The user 108 of the computing device 110 can then select one or more of the collaboration channels 106 to which the content 114 will be posted.

In the example shown in FIG. 1A, for instance, a channel selection exchange 138A has taken place between the collaboration service 102 and the computing device 110B that submitted the posting request 114A. The channel selection exchange 138A can include the transmission of a message from the collaboration service 102 to the computing device 110B that includes a list of the collaboration channels 106 that are available for posting the content 114A. The client application 112 or the browser extension 122 can present an appropriate user interface that includes the list of available collaboration channels 106 and receive a selection of one or more of the channels 106 from the user 108B. A response can then be transmitted to the collaboration service 102 that identifies the channel 106, or channels 106, selected by the user 108B. If a new channel 106 is to be created for the content 114A, the user 108B can also be permitted to supply a name, description, membership, and potentially other information for use in creating the new channel 106.

In response to receiving the selection of one or more of the collaboration channels 106, the collaboration service 102 posts the content 114 to the collaboration channel 106, or channels 106, selected by the user 108. For instance, in the example shown in FIG. 1A, the collaboration service 102 has posted the content 114A to the collaboration channel 106A. The content 114A can also be stored in an appropriate data store, such as the content data store 134 shown in FIG. 1A. The authorized users 108 of the collaboration channel 106A can then view the content 114A and collaborate regarding the content 114A in the manner described above.

In some configurations, the collaboration service 102 can also utilize the context associated with a posting request 118 to determine whether one or more actions are to be automatically taken following the posting of content 114 to a collaboration channel 106. For example, and without limitation, if the computing device 110 utilized to submit the posting request 118 is internal to the trusted network 104, and if the identity of the user 108 submitting the posting request 118 can be authenticated, the collaboration service 102 might initiate an audio communications session, a video communications session, or a real-time messaging communications session between the computing device 110 that posted the content 114 and one or more computing devices 110 operated by other authorized users 108 of the collaboration channel 106 to which the content 114 was posted.

In the example shown in FIG. 1A, for instance, the user 108A is an authorized member of the collaboration channel 106A. As a result, a communications session 140 has been initiated between the computing device 110B and the computing device 110A responsive to the posting of the content 114A in the collaboration channel 106A. As discussed above, the communications session 140 can be an audio communications session, a video communications session, a messaging communications session, or another type of communications session for use in discussing the content 114A.

In some configurations, a suggestion can also, or alternately, be made to a user that identifies other users with which the user may wish to communicate. For example, and without limitation, other users with which a user may wish to communicate might be identified based upon past communications with the other users regarding similar content 114. If a user frequently communicates, or has recently communicated, with another user or group of user, or users, about certain content and a request is received to post similar content, a suggestion might be made to the user recommending a communications session with the other user or users. Such a suggestion can also include information identifying an appropriate communication mechanism, or mechanisms, for communicating with the other user, or users, such as audio/video chat or email. The particular communication mechanism recommended can also be selected based upon information describing communications mechanisms that have been historically utilized by the user.

Although two computing devices 110 have been illustrated in FIG. 1A, it should be appreciated that the communications session 140 can include more than two participants in some configurations. It should also be appreciated that other types of actions might also be initiated by the collaboration service 102 following the posting of content 114 to one or more collaboration channels 106. For example, and without limitation, the collaboration service 102 can initiate a notification message, such as an email, an instant message, or a pre-recorded audio or video message, to the authorized users 108 of a collaboration channel 106 responsive to the posting of content 114 to that channel 106. The particular action, or actions, to be taken following the posting of content 114 can be identified based upon the user's past communication history (e.g. frequent or recent communications), the determined context, the content 114, and/or other considerations.

As shown in FIG. 1A, a collaboration policy data store 136 can store data defining a policy that specifies the types of actions that are to be taken by the collaboration service 102 responsive to content 114 being posted to a channel 106 in some configurations. In these configurations, a policy engine 132 executes within or in conjunction with the collaboration service 102. The policy engine 132 provides functionality for evaluating the context of a request 118, the access rights of the requesting user 108, the policy stored in the collaboration policy data store 136, and/or other information, in order to select the collaboration channels 106 to which content 114 is eligible to be posted, the actions that are to be taken responsive to the posting of content 114 to a channel 106 and, potentially, other types of policy evaluations. Other components can be utilized to perform these functions in other configurations.

The policy stored by the collaboration policy data store 136 can also define the rights of users to view content available through the channels 106 of the collaboration service. The ability to view and/or interact with content available through the collaboration service can also be based upon the location of the user 108 requesting to view the content, access rights associated with the user, and/or other policy considerations. The policy stored by the collaboration policy data store 136 can also define the manner in which each user is permitted to interact with the collaboration service 102 and the content it maintains in other ways not specifically mentioned herein.

In some configurations, the collaboration service is further configured to aggregate posted content 114 with previously posted content 114. For example, and without limitation, if a request 118 is received to post content 114 to a new collaboration channel 106, the collaboration service 120 can determine if the content 114 has been previously posted to one or more other collaboration channels 106. If the content 114 has been previously posted to other collaboration channels 106, and if the user 108 requesting the posting has sufficient access rights to the other collaboration channels 106, the posted content 114 can be aggregated with the previously posted content 114. Duplicative content 114 can also be aggregated in other ways in other configurations. For example, and without limitation, two or more collaboration channels 106 can be merged into a single collaboration channel 106 when duplicative content 114 is posted to the collaboration channels 106.

Referring now to FIG. 1B, other aspects of the operation of the collaboration service 102 for secure context-based group collaboration and communication will be described. In the example shown in FIG. 1B, a computing device 110C is connected to the trusted network 104 by way of an untrusted network 142, such as the Internet, another type of public network, or any other type of public or private network that is considered to be untrustworthy. In this example, the user 108C of the computing device 110C is an unauthorized user of the trusted network 104 that has connected to the trusted network 104 through an untrusted network 142, such as the Internet. This configuration might be desirable, for example, for allowing a member of the public to submit content 114 to the collaboration service 102 regarding a service outage or a customer service issue. The authorized members 108 of the collaboration channel 106 to which the content is posted can then collaborate to discuss the content 114.

In the example shown in FIG. 1B, the user 108C is an unauthorized user of the collaboration service 102. In this example, therefore, the computing device 110C does not include the client application 112. The computing device 110C can, however, include the browser extension 122 and/or a drop target 116 implemented utilizing the HTML DIV mechanism described above.

As shown in FIG. 1B, in this example, the user 108C has utilized the browser extension 122 or the drop target 116 to generate a posting request 118B to the collaboration service for the content 114B. In response thereto, the collaboration service 102 determines the context associated with the posting request 118B. For example, and without limitation, the collaboration service 102 can determine the location of the computing device 110C and determine that the computing device 110C is external to the trusted network 104.

The collaboration service 102, in conjunction with the authentication service 124, can also perform an authentication exchange 126B with the computing device 110C in an attempt to authenticate the identity of the user 108C submitting the posting request 118B. In this example, the user 108C is an unauthorized user 108 of the collaboration service 102 and, therefore, the identity of the user 108C cannot be authenticated.

Because the computing device 110C utilized to submit the posting request 118B is external to the trusted network 104 (e.g. connected to the untrusted network 142), and because the identity of the user 108C submitting the posting request 118B cannot be authenticated, the collaboration service 102 might select collaboration channels 106 that are suitable for receiving content 114 from non-authenticated users, such as members of the public. A channel selection exchange 138B can also be performed in order to allow the user 108C to select the channel 106, or channels 106, to which the content 114B is to be posted. In this case, for example, different channels 106 can be provided for receiving customer service complaints, technical questions, and/or other types of content 114.

In the example shown in FIG. 1B, the user 108C has selected the collaboration channel 106B for posting of the content 114B. As discussed above, the channel 106B is a channel that is suitable for receiving posts containing content 114 that are submitted by remote, non-authenticated users 108, such as members of the public. In a similar fashion, the actions taken by the collaboration service 102 can also be customized for postings made by remote, non-authorized users 108. For example, and without limitation, if the computing device 110 utilized to submit a posting request 114 is external to the trusted network 104, and if the identity of the user 108 submitting the request 114 cannot be authenticated, the collaboration service 102 might cause a notification message such as an email or text message to be transmitted to the authorized users 108 of the channel 106 to which the content 114 was posted indicating that the posting was made. In this way, the authorized users 108 of the channel 106 can be automatically notified of content 114 posted by an external non-authenticated user 108, such as a member of the public, and begin collaboration regarding the posted content 114.

It should be appreciated that the content 114 itself can also, or alternately, be utilized to determine whether it can be posted to one or more of the channels 106. For example, and without limitation, if the posted content 114 is obtained from an untrusted network, such as the Internet, the content can be considered to be untrustworthy. In this example, a user 108 might not be permitted to post the content 114, the channels to which the content 114 can be posted might be restricted, the content 114 can be scanned for viruses or other types of malware, and/or the content 114 may have to go through an approval process prior to posting. In order to enable this functionality, the policy utilized by the policy engine 132 can be configured, for instance, to restrict the posting of content 114 that originates from an untrusted network 142. As another example, a policy can be created that restricts content 114 to information that has been typed by an authorized user 108 or that has been cryptographically signed. Other types of policy determinations and actions can be taken based upon the type of content 114 and/or the type of network from the content 114 originated.

Referring now to FIG. 1C, other aspects of the operation of the collaboration service 102 for secure context-based group collaboration and communication will be described. In the example shown in FIG. 1C, the computing devices 110D and 110E are connected to the trusted network 104 by way of the untrusted network 142. In this example, the user 108D of the computing device 110D is an authorized user of the trusted network 104, but is connecting through the untrusted network 142.

In the example shown in FIG. 1C, the user 108C has utilized the browser extension 122 or the drop target 116 to initiate a posting request 118C to post the content 114E to the collaboration service 102. In this example, the collaboration service 102 determines that the computing device 110D is connected to the untrusted network 142 and is therefore external to the trusted network 104. The collaboration service 102, and potentially the authentication service 124, perform an authentication exchange 126C with the computing device 110D in an attempt to authenticate the user 108D. In this example, the user 108D is associated with the trusted network 104 (e.g. an employee of the organization that operates the trusted network 104 and the collaboration service 102) and, therefore, the user 108D can be successfully authenticated.

Once the location of the computing device 110D and the authenticated identity of the user 108D have been determined, the collaboration service 102 can determine the collaboration channels 106 to which the user 108D is authorized to post. In the example shown in FIG. 1C, the collaboration service 102 might restrict the collaboration channels 106 to which the user 108D is authorized to post because although the user 108D has been authenticated, the user 108D is utilizing a computing device 110D that is external to the trusted network 104. The collaboration service 102 might also restrict other actions that can be taken by the user 108D since the user 108D is using a computing device 110 that is external to the trusted network 104.

In the example shown in FIG. 1C, a channel selection exchange 138C has taken place and the user 108D has selected the collaboration channel 106N for posting the content 114E. The content 114E can also be stored in the content data store 134. In this example, the actions taken by the collaboration service 102 responsive to the posting of the content 114E in the collaboration channel 106N can also be selected based upon the context and the policy stored in the collaboration policy data store 136. For instance, as in the example shown in FIG. 1C, if the computing device 110 utilized to submit a posting request 118 is external to the trusted network 104, and if the identity of the user 108 submitting the request 118 can be authenticated, the collaboration service 102 might cause a notification 146 to be transmitted to other authorized users 108 of the channel 106 to which the content 114 was posted indicating that new content is available. In the example shown in FIG. 1C, for instance, a notification 146 containing the content 114E has been transmitted to the computing device 110E, which is associated with the user 108E. The user 108E is another authorized user of the collaboration channel 106N.

In the example shown in FIG. 1C, because the computing device 110D is external to the trusted network 104, the collaboration service 102 will not initiate an audio, video, or communications session between the authorized users 108 of the collaboration channel 106N (i.e. the users 108D and 108E) in order to ensure that such potentially sensitive communications do not exit the trusted network 104. Other restrictions might also be placed on the type of communications that take place responsive to determining that a computing device 110 is external to the trusted network 104 or that a user 108 submitting content 114 for posting cannot be authenticated.

As shown in FIG. 1C, in some configurations a posting request 118 can also include comments 144 supplied by the user posting the content 114. The comments 144 can, for example, be text comments regarding the content 114. The comments 144 can also have a different associated ACL or other type of access rights than the content 114. In this way, different access rights can be enforced for the comment 144 and the content 114. In the example shown in FIG. 1C, for example, a notification 146 has been transmitted to the computing device 110E associated with the user 108E. In this example, the user 108E has access rights to the comments 144 and, therefore, the comments 144 have been included in the notification 146. The comments 144 might not be included in a notification to another user 108 that does not have access rights to view the comments 144.

It should be appreciated that the system shown in FIGS. 1A-1C can also be configured to determine if a user computing device 110 has transitioned from one network to another. For example, and without limitation, a computing device 110 might transition from an untrusted network 142, such as a public cellular data network, to a trusted network 104, such as a corporate wired or wireless network. When such a transition occurs, an event notification message can be sent from the computing device 110 to the collaboration service 102 informing the collaboration service of the transition. In this regard, it should be appreciated that the computing device 110 can act as a source of other types of event notification messages and, similarly, the policy engine 132 can act as a sink for the messages. The event notifications messages can be utilized to notify the policy engine 132 of the occurrence of different types of events according to various configurations.

Figure 3A:
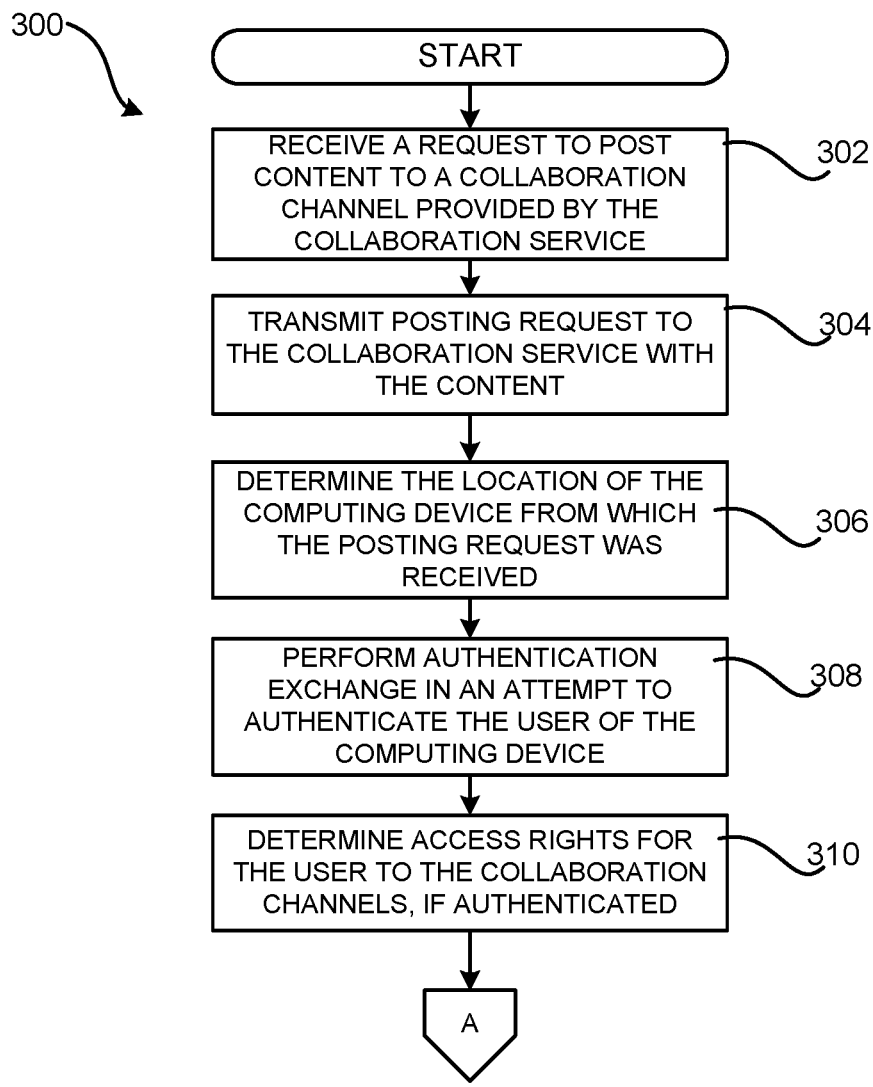
FIGS. 3A and 3B are flow diagrams showing aspects of one illustrative routine for secure context-based group collaboration and communication, according to one configuration disclosed herein.
Figure 3B:
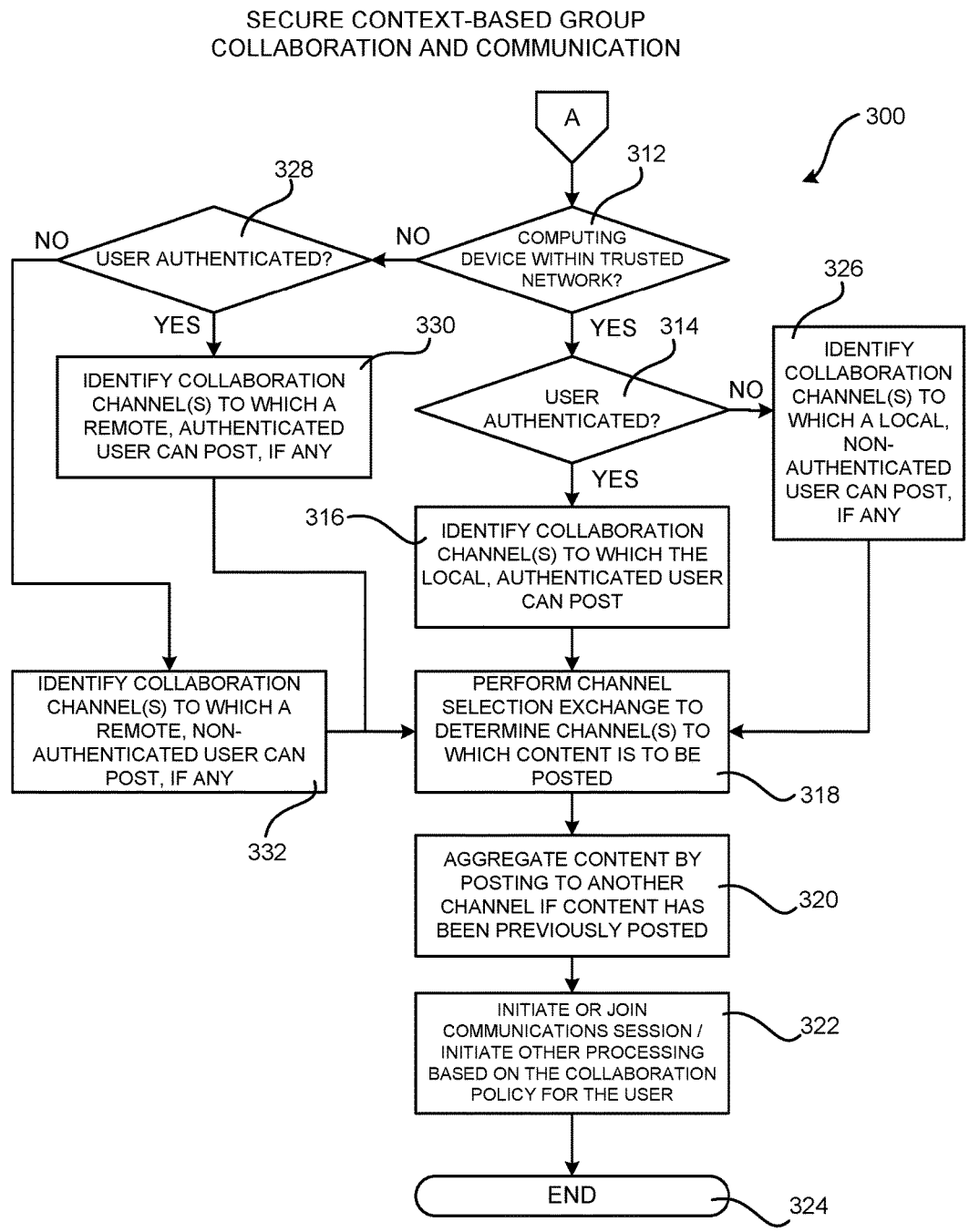

FIGS. 3A and 3B are flow diagrams showing aspects of one illustrative routine 300 for secure context-based group collaboration and communication, according to one configuration disclosed herein. It should be appreciated that the logical operations described herein with respect to FIG. 3, and the other figures, can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the figures and described herein. These operations can also be performed in parallel, or in a different order than those described herein.

The routine 300 begins at operation 302, where a request is received to post content 114 to one or more collaboration channels 106 provided by the collaboration service 102. As discussed above, such a request can be initiated by dragging the content 114 to be posted on a drop target 116, by selecting an icon 212 provided by a browser extension 122, or in another manner. Details regarding several of these mechanisms were provided above with regard to FIG. 2A.

From operation 302, the routine 300 proceeds to operation 304, where the computing device 110 transmits a posting request 118 to the collaboration service 102. As mentioned above, the posting request 118 can include the content 114 to be posted or a reference to the content 114. The posting request 118 can also include user-provided comments 144 or other types of data in other configurations. From operation 304, the routine 300 proceeds to operation 306.

At operation 306, the collaboration service 102 receives the posting request 118 and, responsive thereto, determines the location of the computing device 110 from which the posting request 118 was received. As discussed above, various mechanisms can be utilized to identify the network and/or physical location of the computing device 110. As also discussed above, the collaboration service 102 can determine whether the computing device 110 from which the posting request 118 was received is internal or external to the trusted network 104. Additionally, other attributes of the network connection to the computing device 110 that submitted the content 114 can also be determined. For example, and without limitation, the source of the content 114 and the network path that the content 114 has taken from the computing device 110 in order to arrive at the collaboration service 102 can be determined. These attributes can also be utilized when determining whether content 114 can be posted to a particular collaboration channel 106 and/or accessed by users of the collaboration service 102.

From operation, the routine 300 proceeds to 306 to operation 308, where the collaboration service 102 utilizes the authentication service 124 to attempt to authenticate the user 108 of the computing device 110 from which the posting request 118 was received. As discussed above, an authentication exchange 126 can be performed between the collaboration service 102 and the computing device 110 in an attempt to authenticate the identity of the user 108 that submitted the posting request 118. The routine 300 then proceeds from operation 308 to operation 310.

At operation 310, the collaboration service 102 can utilize the authorization service 130 to determine the access rights to the collaboration channels 106 for the user 108 submitting the posting request 114. These access rights could include, for example, being able to post content to particular channels, being able to read content posted to particular channels, being able to modify or delete content posted to particular channels, being able to communicate with certain individuals, the type of communications sessions that can be opened with other individuals, and/or other types of access rights. Once the access rights for the user 108 to the collaboration channels 106 have been determined, the routine 300 proceeds from operation 310 to operation 312 (shown in FIG. 3B).

At operation 312, the collaboration service 102, or the policy engine 132 executing within or in conjunction with the collaboration service 102, determines whether the computing device 110 from which the posting request 118 was received is internal to the trusted network 104. If the collaboration service 102 determines that the computing device 110 is within the trusted network 104, the routine 300 proceeds from operation 312, where the collaboration service 102 determines if the identity of the user 108 submitting the posting request 114 could be authenticated at operation 308. If the user 108 could be authenticated, the routine 300 proceeds from operation 314 to operation 316.

At operation 316, the collaboration channels 106 to which a local, authenticated user 108 can post are identified. As discussed above with regard to FIG. 1A, in this scenario the available collaboration channels 106 can include all of the collaboration channels 106 to which the user 108 is authorized to post. Once the collaboration channels 106 to which the user 108 can post have been identified, the routine 300 proceeds from operation 316 to operation 318, where a channel selection exchange 138 is performed in order to allow the user 108 to select the channel 106, or channels 106, to which the content 114 is to be posted from the list of channels 106 to which the user is authorized to post.

During the channel selection exchange 138, the user 108 might also be permitted to specify various options associated with the posting. For example, and without limitation, when posting content 114 from a web page, the user could specify whether the entire page is to be posted, whether only a hyperlink to the page is to be posted, or whether only a selected portion of the content on a web page is to be posted. As another example, when posting a word processing document, the user could specify whether or not access rights associated with the document are to be enforced by the collaboration service and/or whether the entire document or a hyperlink to the document are to be posted. The user 108 might also be permitted to specify whether other users are to be notified of the posting and/or whether a communications session is to be automatically established with other users following the posting of the content 114. Different options can also be presented to authenticated, non-authenticated, local, or non-local users according to various configurations. Other types of posting options can also be specified by the user 108 when posting other types of content 114 in other configurations. The routine 300 then proceeds from operation 318 to operation 320.

At operation 320, the content 114 can be aggregated with other identical or similar previously posted content 114. As discussed above, the collaboration service 102 can determine whether identical or similar content 114 has been previously posted to a collaboration channel 106. If so, and if the user 108 has access rights to the collaboration channel 106, the content 114 in the posting request will be aggregated with the previously posted content 114. Other types of aggregation can also be performed in other configurations.

From operation 320, the routine 300 proceeds to operation 322, where a communications session 140 can be initiated or joined based upon the determined context associated with the posting request 118. For example, and as discussed above, if the computing device 110 from which the posting request 118 was received is internal to the trusted network 104 and the posting user 108 can be authenticated, then a communications session 140 can be initiated with other users 108 having access rights to the collaboration channel 106 to which the content 114 was posted. If the computing device 110 from which the posting request 118 was received is external to the trusted network 102 or if the posting user 108 cannot be authenticated, then no communications session 140 will be started or joined.

As discussed above, other types of processing can be performed to initiate other types of actions following the posting of content 114 to a collaboration channel 106. For example, and without limitation, group or private notifications 146 such as email messages or text messages can be transmitted to users 108 having access rights on the channel 106 to which the content 114 was posted, the content 114 can be posted to an internal or external information site, such as a web site, posted to a social networking feed, such as a TWITTER or FACEBOOK feed, or posted to a Really Simple Syndication ("RSS") feed. Other types of actions can also be performed. From operation 322, the routine 300 proceeds to operation 324, where it ends.

If, at operation 314, the collaboration service 102 determines that the user 108 submitting the posting request 118 cannot be authenticated, the routine 300 proceeds from operation 314 to operation 326. At operation 326, the collaboration channels 106 to which a local, non-authenticated user 108 can post content 114 are identified. In this scenario, the available collaboration channels 106 might be restricted to channels 106 suitable for anonymous postings made from computing devices 110 within the trusted network 104. For example, such a posting might be made to channels 106 dedicated to employees of the entity that owns or operates the trusted network 104. Once the collaboration channels 106 to which the user 108 can post have been identified, the routine 300 proceeds from operation 326 to operation 318, which was described above.

If, at operation 312, the collaboration service 102 determines that the computing device 110 that submitted the posting request 114 is external to the trusted network 104, the routine 300 proceeds from operation 312 to operation 328. At operation 328, the collaboration service 102 determines whether the identity of the user 108 submitting the posting request 114 could be authenticated. If the user could be authenticated, the routine 300 proceeds from operation 328 to operation 330. If the user could not be authenticated, the routine 300 proceeds from operation 328 to operation 332.

At operation 330, the collaboration channels 106 to which a remote, authenticated user 108 can post content 114 are identified. As discussed above with regard to FIG. 1C, the collaboration service 102 might restrict the collaboration channels 106 to which the user 108 is authorized to post because, although the user 108 has been authenticated, the user 108 is utilizing a computing device 110 that is external to the trusted network 104. The collaboration service 102 might also restrict other actions that can be taken by such a the user 108 since the user 108 is using a computing device 110 that is external to the trusted network 104. From operation 330, the routine 300 proceeds to operation 318, which was described above.

At operation 332, the collaboration channels 106 to which a remote, non-authenticated user 108 can post content 114 are identified. As discussed above with regard to FIG. 1B, because the computing device 110 utilized to submit the posting request 118 is external to the trusted network 104 (e.g. connected to the untrusted network 142), and because the identity of the user 108 submitting the posting request 118 cannot be authenticated, the collaboration service 102 might select only collaboration channels 106 that are suitable for receiving content 114 from non-authenticated users, such as members of the public. From operation 332, the routine 300 proceeds to operation 318, which was described above.

It should be appreciated that the routine 300 shown in FIGS. 3A-3B are merely illustrative and that other information can also, or alternately, be utilized to identify the collaboration channels 106 to which content is eligible to be posted and/or the rights of other users to access the content 114. For example, and as mentioned above, the content 114 itself, the source of the content 114, the network path that the content 114 took, and/or other attributes can be utilized.

Figure 4:
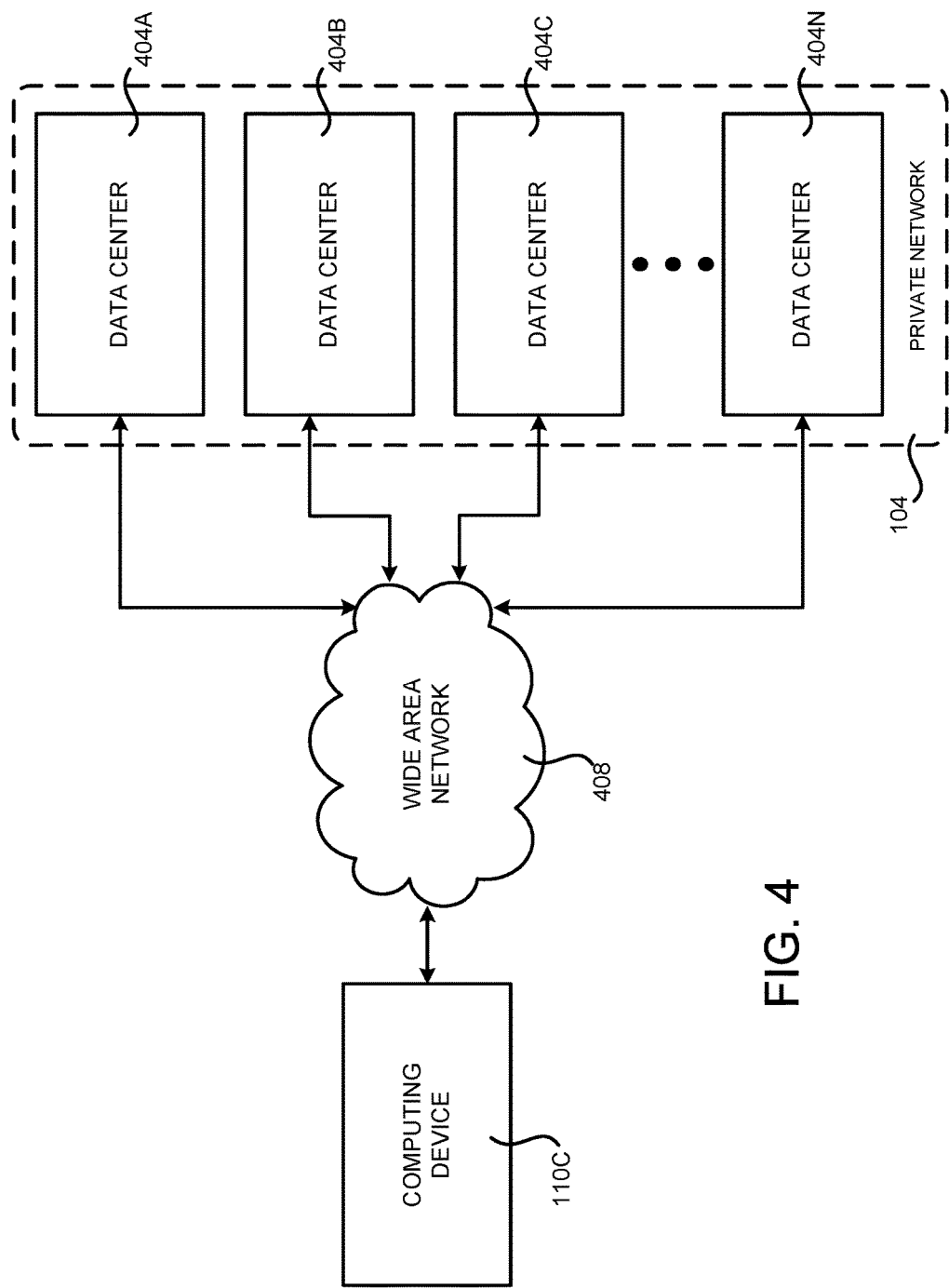
FIG. 4 is a system and network diagram that shows aspects of the configuration of a trusted network that forms an illustrative operating environment for the technologies disclosed herein for secure context-based group collaboration and communication, according to one configuration disclosed herein.

FIG. 4 is a system and network diagram that shows aspects of the configuration of the trusted network 104, which forms an illustrative operating environment for the technologies disclosed herein for secure context-based group collaboration and communication in one particular configuration. As discussed above, the trusted network 104 can implement various network services that together provide the functionality described herein. For example, and without limitation, the computing resources implemented in the trusted network 104 can include various types of computing resources, such as data processing resources like virtual machine ("VM") instances, data storage resources, networking resources, data communication resources, network services, and the like.

Each type of computing resource implemented within the trusted network 104 can be can be available in a number of specific configurations. For example, data processing resources can be available as physical computers or VM instances in a number of different configurations. The VM instances can be configured to execute applications, including Web servers, application servers, media servers, database servers, some or all of the services described above, and/or other types of software. Data storage resources can include file storage devices, block storage devices, and the like. Other types of computing resources not mentioned specifically herein can also be implemented within the trusted network 104 and utilized to implement aspects of the functionality disclosed herein in other configurations.

The trusted network 104 is implemented by computing resources in one or more data centers 404A-404N (which might be referred to herein singularly as "a data center 404" or in the plural as "the data centers 404") in one particular configuration. The data centers 404 are facilities utilized to house and operate computer systems and associated components. The data centers 404 typically include redundant and backup power, communications, cooling, and security systems. The data centers 404 can also be located in geographically disparate locations. One illustrative configuration for a data center 404 that can be utilized to implement the technologies disclosed herein will be described below with regard to FIG. 5.

As discussed above, the various network services provided by the computing resources operating within the trusted network 104 can be accessed from outside the trusted network 104 by way of a network 408, which can be a wide area communication network ("WAN"), such as the Internet. For example, and without limitation, a computing device 110C can be utilized to access the trusted network 104 by way of the network 408 in the manner described above. It should be appreciated that other types of networks and networking topologies can be utilized to connect the data centers 404 to remote computing devices 110 can also be utilized. It should also be appreciated that combinations of such networks can also be utilized in other configurations.

Figure 5:
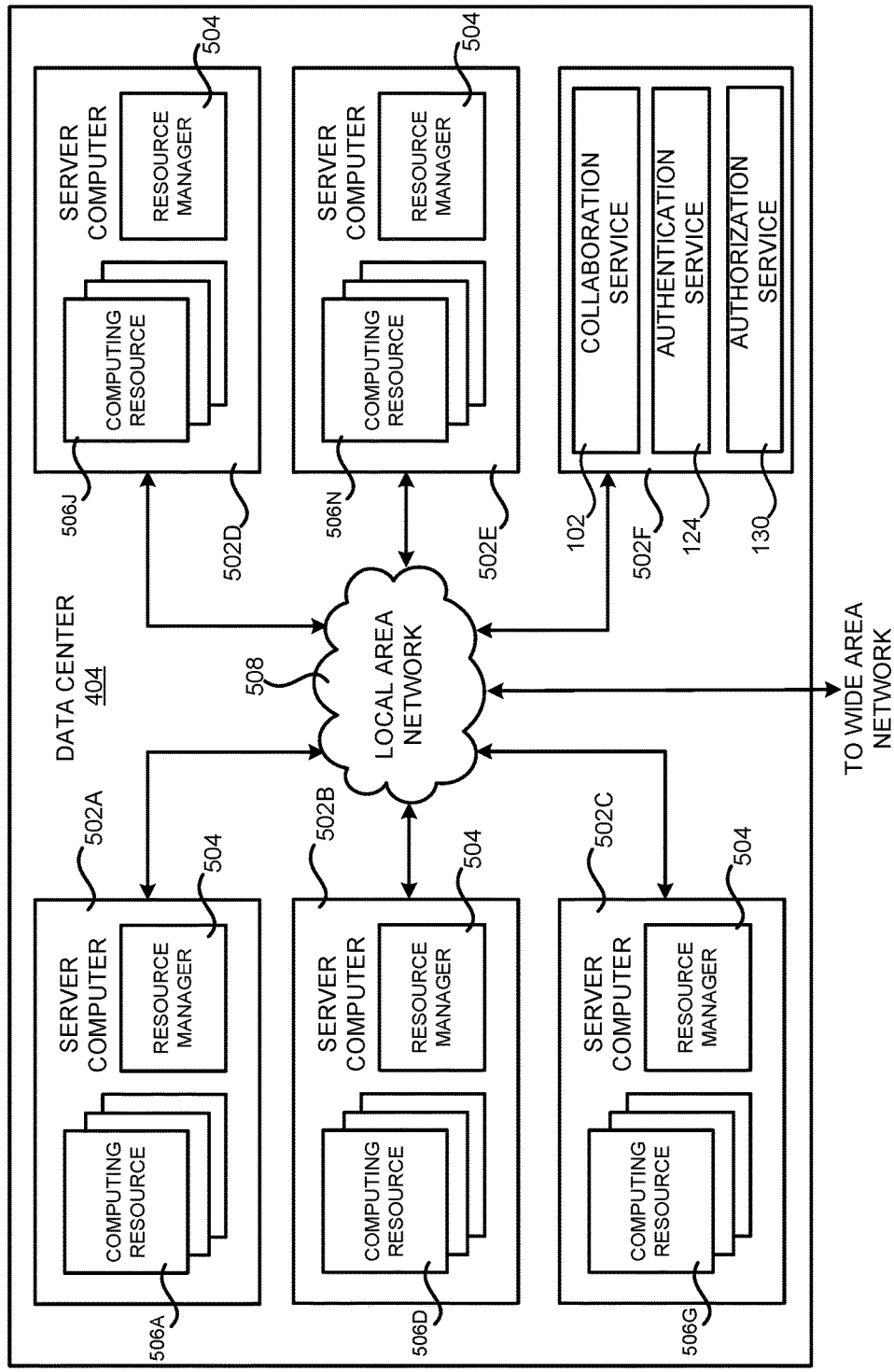
FIG. 5 is a system and network diagram that illustrates one configuration for a data center that can be utilized to implement aspects of the technologies disclosed herein for secure context-based group collaboration and communication.

FIG. 5 is a computing system diagram that illustrates one configuration for a data center 404 that can be utilized to implement the various network services disclosed herein, according to one configuration disclosed herein. The example data center 404 shown in FIG. 5 includes several server computers 502A-502F (which might be referred to herein singularly as "a server computer 502" or in the plural as "the server computers 502") for providing the computing resources 506A-506N (which might be referred to herein singularly as "a computing resource 506" or in the plural as "the computing resources 506").

The server computers 502 can be standard tower, rack-mount, or blade server computers configured appropriately for providing the computing resources 506. As mentioned above, the computing resources 506 provided within the trusted network 104 can be data processing resources such as VM instances or hardware computing systems, data storage resources, database resources, networking resources, or other types of computing resources. Some of the servers 502 can also be configured to execute a resource manager 504 capable of instantiating, providing and/or managing the computing resources 506.

The data center 404 shown in FIG. 5 also includes server computer 502, such as the server computer 502F, that can execute some or all of the software components described above. For example, and without limitation, the server computer 502F can be configured to execute the collaboration service 102, the authentication service 124, and/or the authorization service 130. The server computers 502 can also be configured to execute other components and/or to store data for providing some or all of the functionality described herein. In this regard, it should be appreciated that the collaboration service 102 can execute on many other physical or virtual servers in the data center 404 in various configurations.

In the example data center 404 shown in FIG. 5, an appropriate LAN 508 is also utilized to interconnect the server computers 502A-502F. The LAN 508 is also connected to the network 408 illustrated in FIG. 4. Other computers, such as the computing devices 110A and 110B can also connect to the trusted network 104 by way of the LAN 508. Authorized computing systems can also connect to the trusted network 104 utilizing various types of secure network configurations such as, but not limited to, virtual trusted networks ("VPNs"), virtual private clouds ("VPCs"), and/or other types of secure network configurations.

It should be appreciated that the configuration and network topology described herein with regard to FIGS. 4 and 5 has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 404A-404N, between each of the server computers 502 in each data center 404, and, potentially, between computing resources 506 in each of the data centers 404. It should be appreciated that the configuration of the data center 404 described with reference to FIG. 5 is merely illustrative and that other implementations can be utilized.

Figure 6:
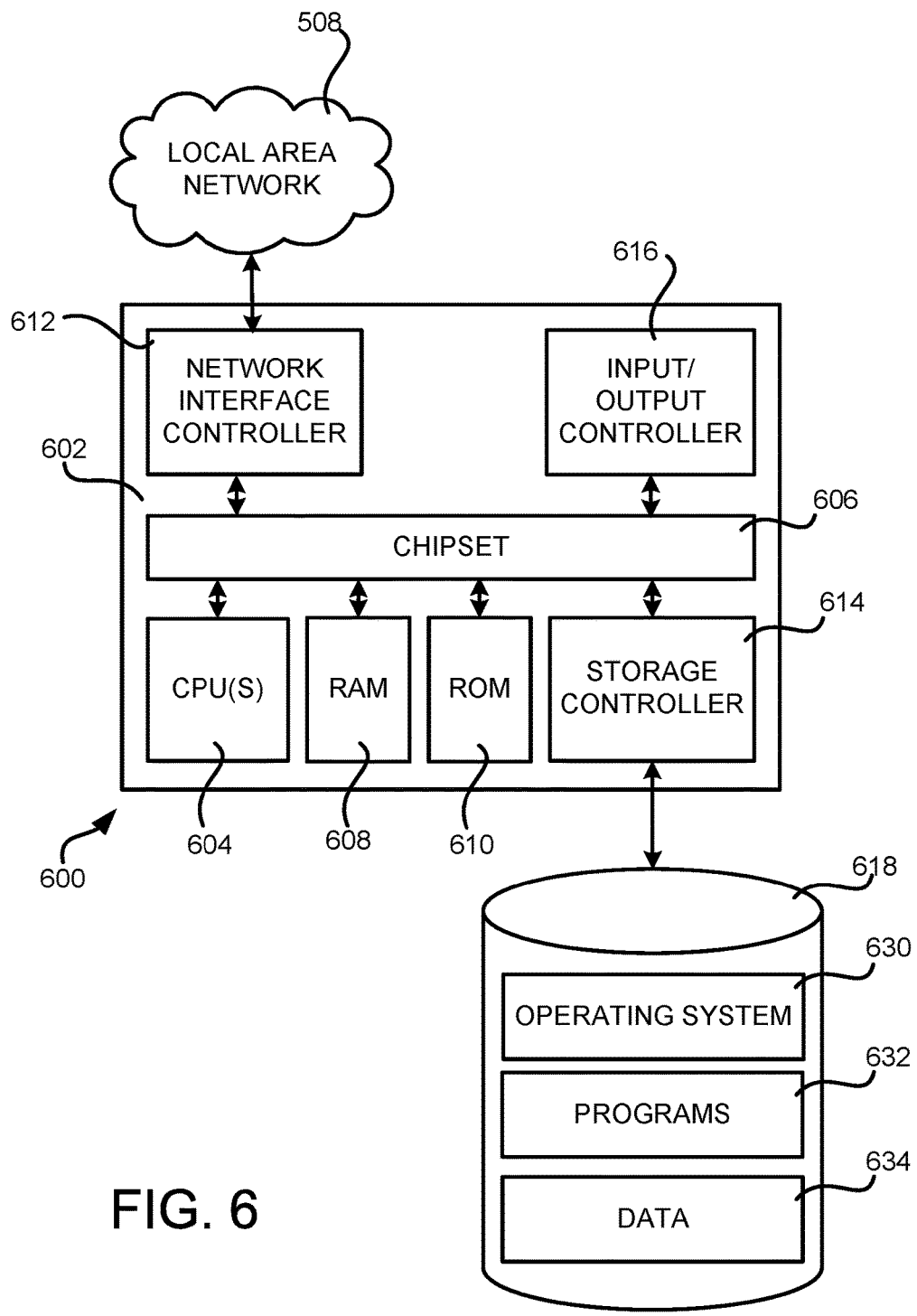
FIG. 6 is a computer architecture diagram showing an illustrative computer hardware architecture for implementing a computing device that can be utilized to implement aspects of the various configurations presented herein.

FIG. 6 is a computer architecture diagram showing an illustrative computer hardware architecture for a computing device that can be utilized to implement aspects of the various configurations presented herein. The computer architecture shown in FIG. 6 illustrates a conventional server computer, workstation, desktop computer, laptop, tablet, network appliance, e-reader, smartphone, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be programmable processors that perform arithmetic and logical operations necessary for the operation of the computer 600.

The CPUs 604 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components for operating the computer 600 in accordance with the configurations described herein.

The computer 600 can operate in a networked environment using logical connections to remote computing devices and computer systems through a network, such as the network 508. The chipset 606 can include functionality for providing network connectivity through a NIC 612, such as a gigabit Ethernet adapter. The NIC 612 is capable of connecting the computer 600 to other computing devices over the network 508. It should be appreciated that multiple NICs 612 can be present in the computer 600, connecting the computer to other types of networks and remote computer systems.

The computer 600 can be connected to a mass storage device 618 that provides non-volatile storage. The mass storage device 618 can store an operating system 630, programs 632, and data 634, which have been described in greater detail herein. The mass storage device 618 can be connected to the computer 600 through a storage controller 614 connected to the chipset 606. The mass storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the mass storage device 618 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 618 is characterized as primary or secondary storage, and the like.

For example, the computer 600 can store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the mass storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 618 can store an operating system 630 utilized to control the operation of the computer 600. In one configuration, the operating system 630 is the LINUX operating system. In another configuration, the operating system 630 is the WINDOWS SERVER operating system from MICROSOFT Corporation. In yet another configuration, the operating system 630 is the UNIX operating system or one of its variants. It should be appreciated that other operating systems can also be utilized. The mass storage device 618 can store other system or application programs and data utilized by the computer 600.

In one configuration, the mass storage device 618 or other computer-readable storage media is encoded with computer-executable instructions which, when loaded into the computer 600, transform the computer into a special-purpose computer capable of implementing the configurations described herein. These computer-executable instructions transform the computer 600 by specifying how the CPUs 604 transition between states, as described above. According to one configuration, the computer 600 has access to computer-readable storage media storing computer-executable instructions which, when executed by the computer 600, perform the various processes described above with regard to FIGS. 1-3B. The computer 600 can also include computer-readable storage media for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, a plotter, or other type of output device. It will be appreciated that the computer 600 might not include all of the components shown in FIG. 6, can include other components that are not explicitly shown in FIG. 6, or might utilize an architecture completely different than that shown in FIG. 6.

Based on the foregoing, it should be appreciated that technologies for secure context-based group collaboration and communication have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system for secure collaboration and communication, the system comprising:
    one or more computing resources at a service provider implementing a collaboration service, wherein the one or more computing resources include non-transitory computer-readable storage medium having computer-executable instructions stored thereupon which, when executed by a computer, cause the one or more computing resources to:
        receive a posting request from a user associated with a first computing device to post content without specified recipients to a collaboration channel provided by the collaboration service, the posting request initiated by user input dragging the content onto a graphical drop target within a graphical user interface associated with the first computing device, the collaboration channel allowing discussion by authorized users within a trusted network about the content;
        receive from the first computing device comments of the user affiliated with the posting request;
        determine, based at least in part on the posting request, whether a location of the first computing device is in the trusted network;
        attempt to authenticate the user to determine an identity of the user;
        identify a set of the collaboration channels to which the user is authorized to post the content based, at least in part, on a context for the post, the context comprising the location of the first computing device as internal or external to the trusted network and the identity of the user as authenticated or non-authenticated;
        in response to the location of the first computing device being external to the trusted network and the identity of the user being non-authenticated, and based at least in part on the content of the post, identify one or more collaboration channels from among the set of the collaboration channels in which the user is authorized to post the content;
        cause to be displayed in the graphical user interface of the first computing device options for selecting among the one or more collaboration channels in which to post the content;
        receive a selection through the graphical user interface of at least one collaboration channel of the one or more collaboration channels;
        aggregate the content with any previously posted content substantially similar to the content in the at least one collaboration channel; and
        notify an authorized user of the at least one collaboration channel within the trusted network about the content being posted by a non-authenticated user external to the trusted network;
        receive a different posting request from a second computing device of a second user to post different content;
        in response to the location of the second computing device being internal to the trusted network and the identity of the second user being authenticated, and based at least in part on the different content, identify one or more different collaboration channels in which the different user is authorized to post the different content, wherein the different content has first access rights defining authorized users permitted to view the different content, and wherein the one or more different collaboration channels are identified based, at least in part, on the first access rights; and
        receive comments of the second user affiliated with the different content, the comments having second access rights defining one or more of the authorized users permitted to view the comments, wherein the first access rights of the different content are different from the second access rights of the comments.

2. The system of claim 1, wherein the non-transitory computer-readable storage medium has further computer-executable instructions stored thereupon to:

determine if the any previously posted content substantially similar to the content posted to a different collaboration channel than the at least one collaboration channel; and merge the different collaboration channel and the at least one collaboration channel.

3. The system of claim 1, wherein the non-transitory computer-readable storage medium has further computer-executable instructions stored thereupon to:

determine based, at least in part, on the location of the first computing device and the identity of the user whether to initiate a communications session between the second computing device and a third computing device; and subsequent to the different content being posted, cause the communications session to be established between the second computing device and the third computing device.

4. The system of claim 3, wherein the communications session comprises an audio communication, a video communication, or a message communication session.

5. The system of claim 1, wherein identifying the one or more different collaboration channels comprises evaluating an access control list indicating users authorized to access the different content.

6. A computer-implemented method, comprising:

receiving a request from a computing device to post content without specified recipients to a communication channel provided by a collaboration service, the communication channel allowing discussion by authorized users within a trusted network about the content;

receiving from the computing device comments of a user affiliated with the request;

attempting to authenticate the user of the computing device;

determining a context associated with the request to post the content to the communication channel, the context comprising a location of the computing device as internal or external to the trusted network and an identity of the user as authenticated or non-authenticated;

in response to the location of the computing device being external to the trusted network and the identity of the user being non-authenticated, and based at least in part on the content of the post, identifying on the computing device one or more communication channels to which the content can be posted based on the context;

receiving a selection of at least one collaboration channel of the one or more collaboration channels;

associating the content with any previously posted content substantially similar to the content in the at least one communication channel;

notifying an authorized user of the one or more communication channels within the trusted network about the content being posted by a non-authenticated user external to the trusted network;

receiving a different request from a second computing device of a second user to post different content;

in response to the location of the second computing device being internal to the trusted network and the identity of the second user being authenticated, and based at least in part on the different content, identifying one or more different collaboration channels in which the different user is authorized to post the different content, wherein the different content has first access rights defining authorized users permitted to view the different content, and wherein the one or more different collaboration channels are identified based, at least in part, on the first access rights; and receiving comments of the second user affiliated with the different content, the comments having second access rights defining one or more of the authorized users permitted to view the comments, wherein the first access rights of the different content are different from the second access rights of the comments.

7. The computer-implemented method of claim 6, wherein attempting to authenticate the user of the computing device further comprises obtaining information associated with the location of the computing device with respect to the trusted network.

8. The computer-implemented method of claim 6, further comprising:

determining based upon the location of the second computing device and the identity of the second user whether to initiate a communications session between the second computing device and a third computing device; and subsequent to the different content being posted, causing the communications session to be established between the second computing device and the third computing device.

9. The computer-implemented method of claim 6, wherein the content comprises one of a uniform resource locator (URL), a document, an audio file, a video file, or text.

10. The computer-implemented method of claim 8, wherein the communications session comprises an audio communication, a video communication, a chat communication, or an email communication.

11. The computer-implemented method of claim 6, wherein identifying the one or more different collaboration channels comprises evaluating an access control list indicating users authorized to access the different content.

12. A non-transitory computer-readable storage medium having computer-executable instructions stored thereupon which, when executed by a computer, cause the computer to:

receive a request from a computing device to share content without specified recipients at a collaboration service hosted by a service provider, the collaboration service allowing discussion by authorized users within a trusted network about the content;

receive from the computing device comments of a user affiliated with the request;

attempt to authenticate the computing device;

determine a context associated with the request to share the content, the context comprising a location of the computing device as internal or external to the trusted network and an identity of a user as authenticated or non-authenticated;

in response to the location of the computing device being external to the trusted network and the identity of the user being non-authenticated, and based at least in part on the content of the post, identify on the computing device one or more collaboration options according to which the content can be shared based, at least in part, on the context;

receive a selection of at least one collaboration option of the one or more collaboration options from the computing device;

cause the content to be shared utilizing the at least one collaboration option provided by the collaboration service;

associate the content with any previously posted content substantially similar to the content in the at least one collaboration channel;

notify an authorized user of the at least one collaboration option within the trusted network about the content being shared by a non-authenticated user external to the trusted network;

receive a different request from a second computing device of a second user to post different content;

in response to the location of the second computing device being internal to the trusted network and the identity of the second user being authenticated, and based at least in part on the different content, identify one or more different collaboration channels in which the different user is authorized to post the different content, wherein the different content has first access rights defining authorized users permitted to view the different content, and wherein the one or more different collaboration channels are identified based, at least in part, on the first access rights; and receive comments of the second user affiliated with the different content, the comments having second access rights defining one or more of the authorized users permitted to view the comments, wherein the first access rights of the different content are different from the second access rights of the comments.

13. The non-transitory computer-readable storage medium of claim 12, having further computer-executable instructions stored thereupon to:

determine if the any previously posted content substantially similar to the content was shared using the collaboration service; and merge the at least one collaboration channel with a collaboration channel containing the previously shared content.

14. The non-transitory computer-readable storage medium of claim 12, having further computer-executable instructions stored thereupon to:

determine based upon the context whether to initiate a communications session between the second computing device and a third computing device; and subsequent to the different content being posted, cause the communications session to be established between the second computing device and the third computing device.

* * * * *